United States Patent [19]
Farquharson

[11] Patent Number: 5,902,560
[45] Date of Patent: May 11, 1999

[54] METHOD FOR INHIBITING PRECIPITATION OF SODIUM OXALATE IN A BAYER PROCESS LIQUOR

[75] Inventor: Graeme J. Farquharson, Sidney, Australia

[73] Assignee: Nalco Chemical Company, Naperville, Ill.

[21] Appl. No.: 08/922,124

[22] Filed: Aug. 28, 1997

[51] Int. Cl.$^6$ .................................................. C01F 7/34
[52] U.S. Cl. ...................... 423/121; 423/130; 423/122; 423/127; 423/123
[58] Field of Search .................... 423/121, 122, 423/127, 123, 130; 23/305 A, 300

[56] References Cited

U.S. PATENT DOCUMENTS

| | | | |
|---|---|---|---|
| 3,649,185 | 3/1972 | Sato et al. .............................. | 423/121 |
| 4,275,043 | 6/1981 | Gnyra .................................... | 423/121 |
| 4,999,170 | 3/1991 | Brown ................................... | 423/121 |
| 5,385,586 | 1/1995 | Farquharson et al. .................. | 423/121 |

OTHER PUBLICATIONS

"The Role of Quaternary Ammonium Compounds in Stabilizing Sodium Oxalate in Bayer Liquors," Farquharson,et al., Fourth International Alumina Quality Workshop, Darwin Jun. 2–7, 1996, pp. 447–456.

Farquharson, et al., "Development of an Effective Liquor Oxalate Stabilizer", Light Metals, pp. 95–101, 1995.

*Primary Examiner*—Steven Bos
*Attorney, Agent, or Firm*—Kelly L. Cummings; Thomas M. Breininger

[57] ABSTRACT

A new and improved method for inhibiting the precipitation of sodium oxalate crystals in a Bayer process liquor is provided. In an embodiment, the method comprises the step of adding to the Bayer process liquor, after red mud separation, a minor effective amount of a liquor oxalate stabilizer selected from hydrocarbon-substituted amine oxide compounds and/or hydrocarbon-substituted betaine compounds.

19 Claims, No Drawings

METHOD FOR INHIBITING PRECIPITATION OF SODIUM OXALATE IN A BAYER PROCESS LIQUOR

BACKGROUND OF THE INVENTION

In the Bayer process for Bauxite ore beneficiation, crystallization and precipitation of solubilized alumina trihydrate values from caustic liquors, referred to herein as Bayer process liquor, is a critical step towards the recovery of aluminum values. Bayer process operators optimize their precipitation methods so as to produce the greatest possible yield from the Bayer process liquors. Production is often limited by processing conditions under which the crystallization and precipitation is conducted. These processing conditions vary from one plant to the next and include temperature profiles, seed charge, seed crystal surface area, liquor loading, liquor purity, and the like.

To obtain the maximum recovery of aluminum values from Bayer process liquor, a plant will typically attempt to maximize the liquor caustic level and minimize the final precipitation temperature. However, it is well known that sodium oxalate can co-precipitate with alumina trihydrate from Bayer process liquor, and that the solubility of sodium oxalate in Bayer process liquor is generally decreased by increasing caustic levels and decreasing precipitation temperatures. Uncontrolled co-precipitation of oxalate can cause a number of problems for a Bayer plant, which place restrictions on plant operating parameters and therefore on aluminum values recovery.

Well known adverse effects of co-precipitation of sodium oxalate include increasing product fines and soda levels, and interference with the efficient size classification of alumina trihydrate. High quality alumina trihydrate usually has a crystal coarseness specification of 90–95% of the crystals being at least 44 microns in diameter. It is known in the art that co-precipitating sodium oxalate can cause the alumina trihydrate crystals to precipitate as a very fine material which is below the usual quality specification of 90–95% of the crystals having 44 microns or greater in diameter.

Alumina trihydrate is precipitated from Bayer process liquor, which in essence is a concentrated sodium hydroxide solution. Typical soda levels in alumina levels are only 0.2–0.6% by weight as $Na_2O$. Nonetheless, it is desirable to produce alumina with soda levels at the lower end of this typical range. Modern smelters generally calculate their break-even point for soda in alumina at 0.35% $Na_2O$. As smelter technology improves and as older smelters are replaced, the incentive will become greater for alumina producers to meet this low soda level. Furthermore, some markets (e.g. catalysts, catalyst supports, refractories, electroceramics) require even lower soda levels. It would be advantageous to provide a method and composition for reducing soda levels in alumina.

SUMMARY OF THE INVENTION

The present invention relates to a new and improved method for stabilizing solubilized sodium oxalate in a Bayer process liquor. This stabilization effect allows the Bayer process operator to add more caustic (NaOH) and/or to lower final precipitation temperatures to improve recovery of aluminum values without adversely affecting product sizing or soda content.

One aspect of the invention provides a method for stabilizing sodium oxalate in Bayer process liquors. In an embodiment, Bayer process liquor is treated with at least one liquor oxalate stabilizer selected from certain hydrocarbon-substituted amine oxide compounds or certain hydrocarbon-substituted betaine compounds. One surprising and unexpected result is that, in an embodiment, the method inhibits the precipitation of sodium oxalate in Bayer process liquor up to surprising levels. Another important and unexpected result obtained by the method of the embodiment is that use of certain of the liquor oxalate stabilizers is effective to provide a coarser alumina trihydrate particle size distribution. A further, and very important, unexpected and surprising result obtained in an embodiment of the method is that use of certain of the liquor oxalate stabilizers provides an alumina product of lower soda content (% $Na_2O$). All of the above listed unexpected and surprising results provide a significant cost savings in the production of quality alumina.

In an embodiment, the present invention modifies the Bayer process by stabilizing the solubilized sodium oxalate so that the concentration of caustic can, surprisingly, be increased without increasing the level of sodium oxalate impurities in the recovered alumina tribydrate. In an embodiment, the present invention additionally modifies the Bayer process by stabilizing the solubilized sodium oxalate so that precipitation temperatures can, surprisingly, be reduced without increasing the level of sodium oxalate impurities in the recovered alumina trihydrate. In an embodiment, the present invention additionally modifies the Bayer process by stabilizing the solubilized sodium oxalate thereby improving alumina trihydrate classification efficiency.

In an embodiment, the method comprises the step of adding to the Bayer process liquor, after red mud separation, and preferably immediately prior to crystallization of the alumina trihydrate or at any stage during crystallization of the alumina trihydrate or at any stage during classification of the alumina trihydrate, an effective amount of at least one liquor oxalate stabilizer selected from the group consisting of:

(a) compounds of the formula:

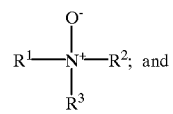

and (b) compounds of the formula:

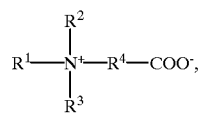

wherein $R_1$ is a straight or branched, saturated or unsaturated hydrocarbon group containing 5 or more carbon atoms; $R^2$ and $R^3$ may be the same or different and each is selected from hydrogen, alkyl, cycloalkyl, hydroxyalkyl, mercaptoalkyl, aminoalkyl, alkenyl, phenyl, substituted phenyl, benzyl, or substituted benzyl; and $R^4$ is a divalent bridging group selected from alkylene, cycloalkylene, arylene, alkarylene or arylalkylene groups, optionally hetero-interrupted with hetero atoms selected from O, S or N.

In an embodiment, the addition of an effective amount of at least one of the above-identified liquor oxalate stabilizers stabilizes the solubilized sodium oxalate in the Bayer process liquor, thereby inhibiting the precipitation of sodium oxalate crystals from the Bayer process liquor. Preferably, the liquor oxalate stabilizer(s) is added in an effective amount of from about 1 to about 1,000 ppm or, more preferably, in an effective amount of from about 1 to about 50 ppm or, even more preferably, in an effective amount from about 5 to about 25 ppm.

In an embodiment, the present invention provides a method for modifying the Bayer process. In the Bayer process, alumina trihydrate crystals are produced by crystallization of alumina trihydrate from a hot caustic Bayer process liquor. Sodium hydroxide solubilizes aluminum values of the ore as sodium aluminate. Plants typically operate in a total alkalinity range of 200 to 330 g/l as $Na_2CO_3$. If the alkalinity can be increased by adding sodium hydroxide, more aluminum values can be dissolved resulting in increased production of alumina trihydrate precipitate. A major limiting factor to higher alkalinity is the co-precipitation of sodium oxalate, which for example causes the alumina trihydrate to precipitate as a very fine material which is below the usual quality specification of 90 to 95% particles having a particle size of at least about 44 microns.

Stabilization of sodium oxalate in the Bayer liquor permits sodium hydroxide concentration to be increased without the co-precipitation of sodium oxalate. Additional aluminum values can be recovered from Bayer process liquor by lowering precipitation temperatures. Stabilization of sodium oxalate in the Bayer liquor will allow the decrease in precipitation temperature without co-precipitation of sodium oxalate. The methods in accordance with the present invention stabilize dissolved sodium oxalate and prevent it from co-precipitating with alumina trihydrate. This, in turn, increases the efficiency of the entire process since more caustic and/or lower precipitation temperatures can be used without the expected contamination by sodium oxalate crystals. Additionally, co-precipitation of sodium oxalate can lead to inefficiencies in the classification of alumina trihydrate. The present invention stabilizes dissolved sodium oxalate leading to improved classification of alumina trihydrate.

DETAILED DESCRIPTION OF THE PRESENTLY PREFERRED EMBODIMENTS

The new and improved liquor oxalate stabilizers for use in the methods of the present invention may comprise at least one hydrocarbon-substituted amine oxide and/or at least one hydrocarbon-substituted betaine. Mixtures of one or more of the amine oxides may be used. Mixtures of one or more of the betaines may be used. In addition, mixtures of one or more of the amine oxides and one or more of the betaines may be used.

Suitable hydrocarbon-substituted amine oxide compounds for use as the liquor oxalate stabilizers herein comprise at least one compound of the formula:

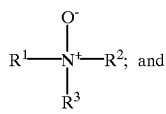

wherein $R^1$ is a straight or branched, saturated or unsaturated hydrocarbon group containing 5 or more carbon atoms and $R^2$ and $R^3$ are the same or different and each is selected from hydrogen, alkyl, cycloalkyl, hydroxyalkyl, mercaptoalkyl, aminoalkyl, alkenyl, phenyl, substituted phenyl, benzyl, or substituted benzyl. Preferred groups for use as the $R^1$ substituent of the formula include straight saturated hydrocarbon groups preferably containing 10 or more carbon atoms. Illustrative $R^1$ fatty side chains include: decyl, e.g. $C_{10}H_{21}$; undecyl, e.g. $C_{11}H_{23}$; dodecyl (lauryl), e.g. $C_{12}H_{25}$; tetradecyl (myristyl), e.g., $C_{14}H_{29}$; hexadecyl (palmityl), e.g., $C_{16}H_{33}$; octadecyl (stearyl), e.g. $C_{18}H_{37}$; icosanyl, e.g. $C_{20}H_{41}$, to name but a few. As used herein cocoalkyl designates a mixture of long chain hydrocarbon groups comprising $C_{12}/C_{14}$ hydrocarbons. Alternatively, unsaturated fatty side chains such as oleyl, e.g. $C_{18}$ may also be used as the $R^1$ substituent. $R^2$ and $R^3$ may be alkyl, e.g., $C_1$–$C_6$ alkyl, such as methyl, ethyl, propyl, butyl, pentyl, hexyl; cycloalkyl, such as cyclobutyl, cyclopentyl, cyclohexyl, cycloheptyl, cyclooctyl or the like. Preferably $R^2$ and $R^3$ comprise active hydrogen group terminated alkyl groups such as hydroxyalkyl, mercaptoalkyl or aminoalkyl. $R^2$ and $R^3$ additionally may be selected from alkenyl, phenyl, substituted phenyl, e.g. halogen substituted phenyl or alkyl substituted phenyl; benzyl, or substituted benzyl, e.g., halogen substituted benzyl or alkyl substituted benzyl. Especially preferred for $R^2$ and $R^3$ are alkyl groups or active hydrogen terminated alkyl groups having from about 1 to about 6 carbon atoms. Especially preferred hydrocarbon-substituted amine oxide compounds for use as the Bayer liquor oxalate stabilizers herein include lauryl-N,N-dimethylamine oxide; myristyl-N,N-dimethylamine oxide; palmityl-N,N-dimethylamine oxide; stearyl-N,N-dimethylamine oxide; icosanyl-N,N-dimethylamine oxide; oleyl-N,N-dimethylamine oxide and cocoalkyl-N,N- bis(2-hydroxyethyl)amine oxide.

The hydrocarbon-substituted amine oxides for use as the liquor oxalate stabilizers in accordance with this invention are presently commercially available from Albemarle Corporation as well as from other commercial sources.

Suitable hydrocarbon-substituted betaine compounds for use as the liquor oxalate stabilizers herein comprise at least one compound of the formula:

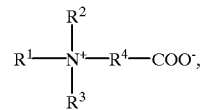

wherein $R^1$ is a straight or branched, saturated or unsaturated hydrocarbon containing 5 or more carbon atoms, $R^2$ and $R^3$ may be the same or different and each is selected from hydrogen, alkyl, cycloalkyl, hydroxyalkyl, mercaptoalkyl, aminoalkyl, alkenyl, phenyl, substituted phenyl, benzyl, or substituted benzyl; and $R^4$ is a divalent bridging group selected from alkylene, cycloalkylene, arylene, alkarylene or arylalkylene groups, optionally hetero-interrupted with hetero atoms selected from O, S or N. The $R^1$, $R^2$ and $R^3$ groups are the same as those described above with respect to the hydrocarbon-substituted amine oxide compounds. Preferably, $R^1$ comprises a hydrocarbon group containing 10 or more carbon atoms and preferably $R^2$ and $R^3$ will be $C_1$–$C_6$ alkyl or $C_1$–$C_6$ alkyl terminated with active hydrogen groups selected from hydroxy, mercapto or amino groups. $R^4$ in accordance with the formula is a divalent bridging group selected from alkylene, such as $C_2$–$C_6$ alkylene, cycloalkylene such as 1,4-cyclohexylene, or 1,4-dimethylcyclohexylene, arylene, such as phenylene or diphenylmethane, alkarylene, such as ethylphenyl, or arylalkylene, such as phenylethyl. $R^4$ may optionally be hetero interrupted by O, S or N hetero atoms, such as for example, ethoxyethyl and the like. Preferably, the hydrocarbon-substituted betaine is one in which $R^1$ is a saturated hydrocarbon chain containing 10 or more carbon atoms, $R^2$ and $R^3$ are $C_1$–$C_4$ alkyl and $R^4$ is $C_2$–$C_4$ alkylene. Especially preferred hydrocarbon-substituted betaines comprise cocoalkyl betaine, lauryl betaine and stearyl betaine. These hydrocarbon-substituted betaines are commercially available from Albright & Wilson as well as other commercial sources. Alternatively, they may be obtained by reacting a corresponding hydrocarbon-substituted tertiary amine compound with chloroacetic acid at slightly acidic pH with water addition, in accordance with methods well known to those skilled in this art.

The hydrocarbon-substituted amine oxides or betaines are added to the Bayer process liquor and intimately admixed with the liquor in an amount of from about 1 to about 1,000 parts per million. Preferably the liquor oxalate stabilizers are added in an amount of from about 1 to about 50 parts per million, and especially preferably in an amount of from about 1 to about 25 parts per million to provide sodium oxalate solution stability.

The new and improved liquor oxalate stabilizers may be added to the Bayer process liquor after red mud separation, immediately prior to crystallization of the alumina trihydrate, or at any stage during crystallization of the alumina trihydrate, or at any stage during classification of the alumina trihydrate. The hydrocarbon-substituted amine oxides and betaines of the invention may be added neat or in solution form in an appropriate solvent. Appropriate solvents include without limitation, water, alcohols caustic water and Bayer process liquor.

EXAMPLES 1–4

In the following examples, a number of liquor oxalate stabilizers were tested for oxalate stabilizing ability.

Preparation 1—Preparation of palmityl betaine

A 25% by weight solution of palmityl betaine was prepared by providing a cooled solution of chloroacetic acid (18.9 grams 0.2 m) dissolved in water (400 ml) and adding dropwise a 25% sodium hydroxide solution until a pH of 6.2 was reached. Thereafter, dimethylhexadecylamine (53.8 g, 0.2 m) from Albemarle Corporation was added and the mixture was gently refluxed for a period of eight hours. In this time period, water was added in small portions until a solution containing 25% actives as betaine was obtained. Another hydrocarbon-substituted betaine comprising a 30% coco betaine was commercially available from Albright & Wilson.

In each of the following examples, the Bayer process liquor charged and employed for the sodium oxalate stability studies is a hot caustic solution obtained after elimination of the red mud in the Bayer process. The liquor, after red mud separation is a hot caustic filtrate which in commercial embodiments contains the aluminum values as dissolved sodium aluminate. To determine liquor oxalate stabilization, the Bayer process liquors, after red mud separation, were obtained and reported quantities of the hydrocarbon-substituted amine oxides and betaines were added at the reported dosage level to various samples containing varying concentrations of sodium oxalate. After addition of the liquor oxalate stabilizers, the process liquors were cooled under agitation to stress the contents and cause precipitation of alumina trihydrate crystals. The concentration at which sodium oxalate precipitated from the Bayer process liquor during precipitation of the alumina trihydrate crystals was noted as a sodium oxalate breakpoint. The liquor oxalate stabilizers tested and the results obtained are set forth in Table 1 as follows:

TABLE 1

STABILIZING EFFECT OF SUBSTITUTED AMINE OXIDE AND BETAINE STABILIZERS ON OXALATE BREAKPOINT

| EXAMPLE | A | 1 | 2 | 3 | 4 |
|---|---|---|---|---|---|
| Liquor Oxalate Stabilizer | | | | | |
| lauryl (dimethyl) amine oxide, 30% actives | — | 10 ppm | — | — | — |
| cocoalkyl (dimethyl) amine oxide, 30% actives | — | — | 10 ppm | — | — |
| palmityl (dimethyl) betaine, 25% actives from Preparation A as 1% w/w water solution | — | — | — | 10 ppm | — |
| coco betaine, 30% actives | — | — | — | — | 10 ppm |
| oxalate breakpoint (g/L) | 3.09 ± 0.05 | >4.10 | >4.10 | >4.10 | >4.26 |

From the results of Table 1, the hydrocarbon-substituted amine oxide stabilizers of Examples 1 and 2 and the hydrocarbon-substituted betaines of Examples 3 and 4 significantly increased the oxalate breakpoint concentration to greater than 4.10 g/L, as compared to the control value of 3.09±0.05 for the control sample with no oxalate stabilizer added.

EXAMPLES 5–6

In the following examples two additional liquor oxalate stabilizers were tested in accordance with the method of Examples 1–4. The stabilizers tested and the results obtained are set forth in Table 2 as follows:

TABLE 2

LIQUOR OXALATE STABILIZER

| Liquor Oxalate Stabilizer | B | 5 | 6 |
|---|---|---|---|
| N,N-dimethyl-coco amine oxide | — | 5 ppm | — |
| N,N-bis(2-hydroxyethyl)cocoamine oxide | — | — | 5 ppm |
| Oxalate Breakpoint, (g/L) | 3.21 ± 0.06 | >4.26 | 4.05 ± 0.12 |

The hydrocarbon-substituted amine oxide stabilizers of Examples 5 and 6 also increased the oxalate breakpoint to greater than 4 g/L as compared with the 3.21±0.06 g/L breakpoint for the untreated control, even at the lower dosage level of only 5 ppm.

The data of Tables 1 and 2 demonstrate that the sodium oxalate is stabilized at low doses by the new and improved liquor oxalate stabilizer compounds in accordance with the present invention. The addition of these new and improved Bayer process sodium oxalate stabilizers will permit refinery operators to operate at higher caustic levels and/or lower precipitator temperatures without premature precipitation of sodium oxalate, thereby increasing yield.

Although the present invention has been described with reference to certain preferred embodiments, modifications or changes may be made therein by those skilled in this art without departing from the scope and spirit of the invention, as defined by the appended claims.

What is claimed is:

1. A method for inhibiting the precipitation of sodium oxalate crystals in a Bayer process liquor comprising the step of: adding to the Bayer liquor, after red mud separation, an effective inhibiting amount of at least one liquor oxalate stabilizer selected from the group consisting of:

(a) compounds of the formula:

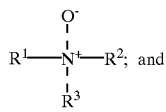

(b) compounds of the formula:

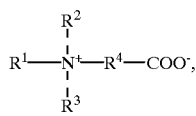

wherein $R^1$ is a straight or branched, saturated or unsaturated hydrocarbon group containing 5 or more carbon atoms; $R^2$ and $R^3$ may be the same or different and each is selected from hydrogen, alkyl, cycloalkyl, hydroxyalkyl, mercaptoalkyl, aminoalkyl, alkenyl, phenyl, substituted phenyl, benzyl, or substituted benzyl; and $R^4$ is a divalent bridging group selected from alkylene, cycloalkylene, arylene, alkarylene or arylalkylene groups, optionally hetero-interrupted with hetero atoms selected from O, S or N.

2. The method defined in claim 1, wherein the amount of liquor oxalate stabilizer added to the Bayer process liquor is from about 1 to about 50 ppm.

3. The method defined in claim 1, wherein the amount of liquor oxalate stabilizer is added to the Bayer process liquor in an amount of from about 1 to about 25 ppm.

4. The method defined in claim 1, wherein the liquor oxalate stabilizer is added to the Bayer process liquor after red mud separation and immediately prior to crystallization of alumina trihydrate, or during crystallization of alumina trihydrate.

5. The method defined in claim 1, wherein $R^1$ is a straight or branched, saturated or unsaturated hydrocarbon group containing 10 or more carbon atoms.

6. The method defined in claim 1, wherein the liquor oxalate stabilizer is at least one amine oxide having the formula:

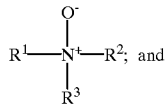

wherein $R^1$ is a straight or branched, saturated or unsaturated hydrocarbon group containing 5 or more carbon atoms and $R^2$ and $R^3$ are the same or different and each is selected from hydrogen, alkyl, cycloalkyl, hydroxyalkyl, mercaptoalkyl, aminoalkyl, alkenyl, phenyl, substituted phenyl, benzyl, or substituted benzyl.

7. The method defined in claim 6, wherein $R^1$ is a straight or branched, saturated or unsaturated hydrocarbon group containing 10 or more carbon atoms and $R^2$ and $R^3$ are the same or different and are each selected from alkyl, cycloalkyl, hydroxyalkyl, mercaptoalkyl or aminoalkyl groups.

8. The method defined in claim 6, wherein the liquor oxalate stabilizer comprises lauryl-N, N-dimethylamine oxide.

9. The method defined in claim 6, wherein the liquor oxalate stabilizer comprises myristyl-N, N-dimethylamine oxide.

10. The method of Claim 6, wherein the liquor oxalate stabilizer comprises palmityl-N, N-dimethylamine oxide.

11. The method of claim 6, wherein the liquor oxalate stabilizer comprises stearyl-N, N-dimethylamine oxide.

12. The method of claim 6, wherein the liquor oxalate stabilizer comprises icosanyl-N, N-dimethylamine oxide.

13. The method of claim 6, wherein the liquor oxalate stabilizer comprises oleyl-N, N-dimethylamine oxide.

14. The method of claim 6, wherein the liquor oxalate stabilizer comprises cocoyl-N, N-bis(2-hydroxyethyl) amine oxide.

15. The method defined in claim 1, wherein the liquor oxalate stabilizer comprises at least one hydrocarbyl betaine of the formula:

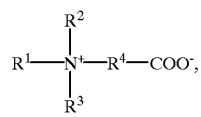

wherein $R^1$ is a straight or branched, saturated or unsaturated hydrocarbon containing 5 or more carbon atoms, $R^2$ and $R^3$ may be the same or different and each is selected from hydrogen, alkyl, cycloalkyl, hydroxyalkyl, mercaptoalkyl, aminoalkyl, alkenyl, phenyl, substituted phenyl, benzyl, or substituted benzyl; and $R^4$ is a divalent bridging group selected from alkylene, cycloalkylene, arylene, alkarylene or arylalkylene groups, optionally hetero-interrupted with hetcro atoms selected from O, S or N.

16. The method defined in claim 15, wherein $R^1$ is a straight or branched, saturated or unsaturated hydrocarbon containing ten or more carbon atoms, $R^2$ and $R^3$ are $C_1$-$C_4$ alkyl and $R^4$ is $C_{1-C4}$ alkylene.

17. The method defined in claim 15, wherein the liquor oxalate stabilizer comprises cocoyl betaine.

18. The method defined in claim 15, wherein the liquor oxalate stabilizer comprises lauryl betaine.

19. The method defined in claim 15, wherein the liquor oxalate stabilizer comprises stearyl betaine.

* * * * *

UNITED STATES PATENT AND TRADEMARK OFFICE
CERTIFICATE OF CORRECTION

PATENT NO. : 5,902,560
DATED : May 11, 1999
INVENTOR(S) : Graeme J. Farquharson

It is certified that error appears in the above-identified patent and that said Letters Patent is hereby corrected as shown below:

Column 8, Line 44, Claim 15 cro atoms selected from O, S or N.

Should Read As:

ero atoms selected from O, S or N.

Column 8, Line 48, Claim 16 alkyl and $R^4$ is $C_1$-$c_4$ alkylene.

Should Read As:

alkyl and $R^4$ is $C_1$-$C_4$ alkylene.

Signed and Sealed this

Twelfth Day of October, 1999

Attest:

Q. TODD DICKINSON

Attesting Officer    Acting Commissioner of Patents and Trademarks